United States Patent

[11] 3,573,538

[72] Inventor Roger A. Swanberg
 Bensenville, Ill.
[21] Appl. No. 823,409
[22] Filed May 9, 1969
[45] Patented Apr. 6, 1971
[73] Assignee Motorola, Inc.
 Franklin Park, Ill.

[54] GATING CIRCUIT FOR SELECTING SYNCHRONIZATION PULSES TO TRIGGER AN OSCILLOSCOPE
 5 Claims, 10 Drawing Figs.
[52] U.S. Cl................................................. 315/18, 328/72
[51] Int. Cl......................................................... H01j 29/70
[50] Field of Search........................................... 328/63, 72; 315/18

[56] References Cited
UNITED STATES PATENTS
3,509,473 4/1970 LaPorta.......................... 328/63X Primary Examiner—Rodney D. Bennett, Jr.
Assistant Examiner—Brian L. Ribando
Attorney—Mueller, Aichele and Rauner ABSTRACT: The oscilloscope triggering circuit translates a composite video television signal to derive selected synchronization pulses which are used to trigger the horizontal sweep of an oscilloscope trace so that waveforms applied to the vertical input of the oscilloscope and which occur in time relation with the selected pulses are displayed thereon.

INVENTOR
ROGER A. SWANBERG

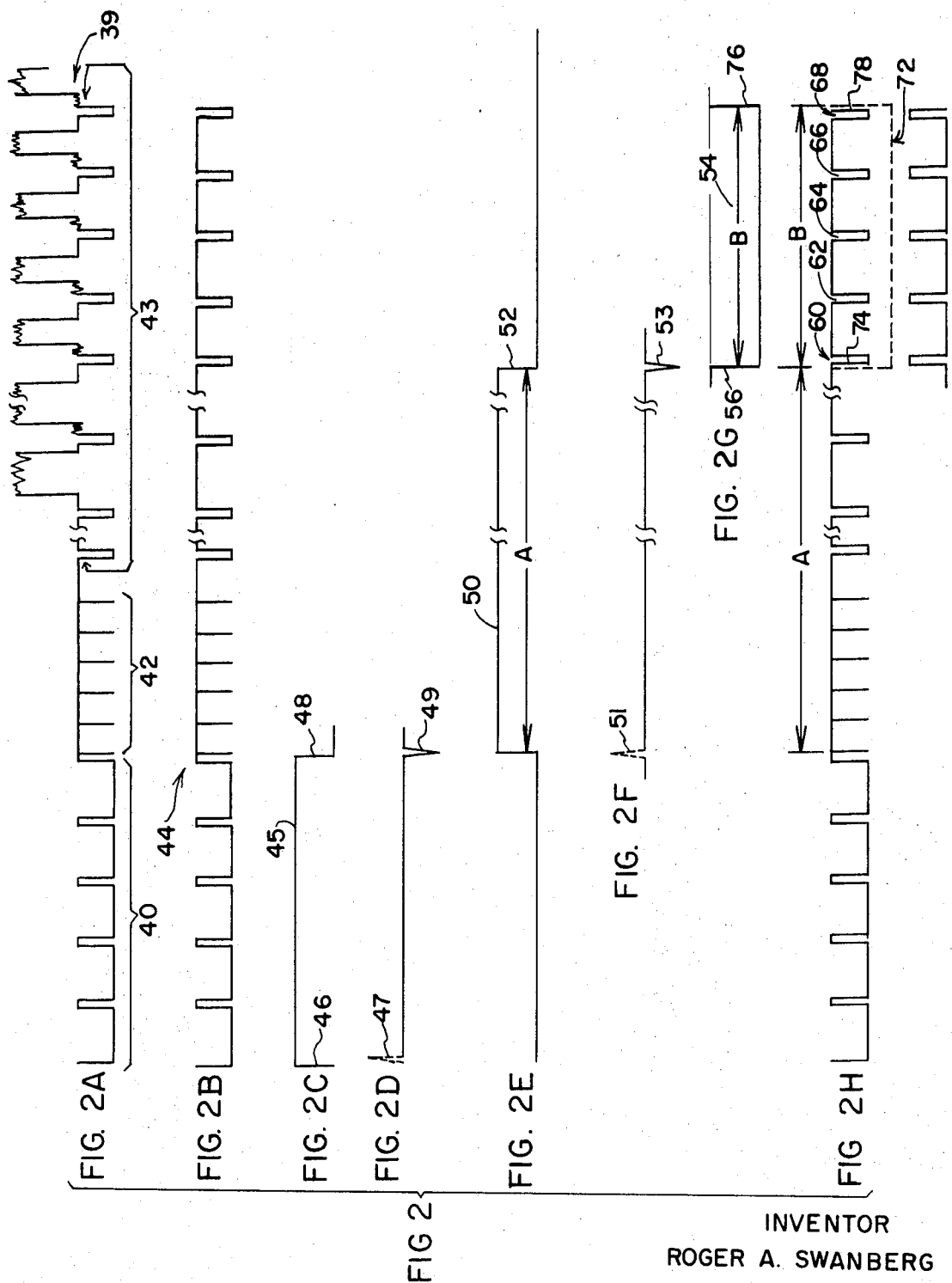

GATING CIRCUIT FOR SELECTING SYNCHRONIZATION PULSES TO TRIGGER AN OSCILLOSCOPE

BACKGROUND OF THE INVENTION

The synchronizing (sync) signal train for controlling the timing of the scan of an electron beam in a cathode-ray tube of a television receiver is comprised of horizontal, vertical, and equalizing pulses which all have about the same amplitude. Since the triggerable firing circuitry which sweeps the electron beam in an ordinary oscilloscope is sensitive only to the amplitude of an external trigger signal applied thereto, the firing circuitry cannot distinguish between successive ones of these sync pulses. Consequently, the ordinary oscilloscope cannot easily be directly fired by the occurrence of a given single sync pulse in each field or a particular group of successive sync pulses so that waveforms occurring in close or equal time relation in each field or field to field therewith can be displayed on the scope.

The foregoing limitation of the ordinary oscilloscope makes many timing and other waveform measurements related to the electrical operation of television receivers difficult, and in some cases impossible, to make. When solving scan interlace problems, for example, it is sometimes desirable to very accurately measure the time interval between the lagging edge of the vertical yoke current waveform for a first field in a frame and the lagging edge of the vertical yoke current waveform for the successive or immediately following second field. Because the period of each vertical sawtooth is on the order of 500 times the time interval to be measured and because the time axis of the graticule of the scope is only about 10 centimeters long, the required accuracy of the measurement of the time interval is extremely difficult to achieve when the scope is triggered directly from the sawtooth waveforms themselves. To make the desired measurement it would be advantageous if the oscilloscope could be triggered on the horizontal sync pulse immediately preceding the leading edge of the vertical blanking pulse of each vertical field. The trigger and sweep speed controls of the scope would be set so that the beam of the scope is fired by the horizontal sync pulses somewhere near the termination of the first vertical sawtooth so that the beam would trace only the termination of the first vertical sawtooth waveform and the beginning of the second vertical sawtooth for each field thereby enabling the two lagging edges to be displayed simultaneously in time relation to the horizontal sync, and the time difference between the waveforms to fill most of the graticule so that the measurement of the time interval between given current levels of the vertical yoke waveforms in succeeding fields, with respect to horizontal sync, can be accurately performed.

Furthermore, in testing and designing color television receivers, a color bar composite video signal wherein each field may contain six groups of about 40 identical scan lines is introduced into the circuitry to be tested. The processing of the color bar signal is then observed at various stages in the circuitry by use of an oscilloscope. Some oscilloscopes having a second time base can select and display the video signal for a given horizontal line of the processed color bar signal when the scope is adjusted to have a comparatively low horizontal sweep rate. The resulting image on the oscilloscope, however, is too dim to be adequately seen when it is expanded by increasing the sweep rate so that the operator can view the transients, for instance, between two color bursts on the same horizontal line of the color bar signal. If the scope could be triggered by several selected horizontal sync pulses occurring in coincidence with the beginning of the scan lines of a given one of the six groups, then the associated video signal would be traced and retraced by the beam of the scope when its sweep rate was high. This tracing and retracing would result in substantial trace brightening because of the superposition of the image so that otherwise unseen details of the waveform can be distinguished.

SUMMARY OF THE INVENTION invention

It is one object of the invention to improve triggering circuits for an oscilloscope.

Another object of one embodiment of the invention is to provide an oscilloscope triggering system that will deliver a trigger signal or successive trigger signals to fire an oscilloscope in time coincidence with the respective occurrence of a selected television synchronization pulse or pulses.

Still another object of one embodiment of the invention is to provide an oscilloscope triggering system that will select any single one or plurality of successive synchronization pulses from a television composite video signal and apply them to the trigger input of an oscilloscope so that the oscilloscope can be selectively triggered thereby.

The oscilloscope triggering circuit of the invention provides trigger signals by allowing only selected ones or selected groups of successive sync pulses from a composite video signal to be applied to the trigger input of an oscilloscope. The sync pulses are first clipped from a composite video television signal and applied to one input of a dual input gate and to a separating circuit which separates out the vertical sync pulses. A first timing circuit is triggered by the termination of each vertical sync pulse to produce a delay pulse whose time duration can be adjusted. The termination of this delay pulse, in turn, triggers an enabling circuit to produce a delayed enabling pulse of adjustable duration which is applied to the other input of the dual input gate. Whatever synchronization pulses are applied to the gate during the time duration of the enable pulse are allowed to pass through the gate to trigger the oscilloscope. Therefore, by adjusting the time duration of the delaying pulse the beginning of the enable signal with reference to each vertical sync pulse can be established; and by adjusting the pulse duration of the enabling pulse itself any desired sync pulse or successive pulses occurring subsequent to the beginning of the enabling signal will pass through the gate to trigger the oscilloscope. These selected trigger signals facilitate observation on the oscilloscope of selected periodic waveforms occurring in close or equal time relation therewith.

BRIEF DESCRIPTION OF THE DRAWINGS

FIG. 2 is a timing diagram for illustrating the operation of a preferred embodiment of the invention and it includes the following:

FIG. 2A is an illustration of selected portions of a composite video television signal;

FIG. 2B is an illustration of synchronizing pulses removed from the composite video signal of FIG. 2A;

FIG. 2C shows a vertical sync pulse whose serrations have been removed;

FIG. 2D shows the results of differentiating the vertical sync pulse of FIG. 2C;

FIG. 2E shows the positive-going output pulse of the first timing circuit;

FIG. 2F illustrates the results of differentiating the delay pulse of FIG. 2E;

FIG. 2G shows the enabling pulse of the enabling circuit; and

FIG. 2H is a timing diagram illustrating one application of the oscilloscope triggering system.

DESCRIPTION OF THE PREFERRED EMBODIMENT

Figure 1:
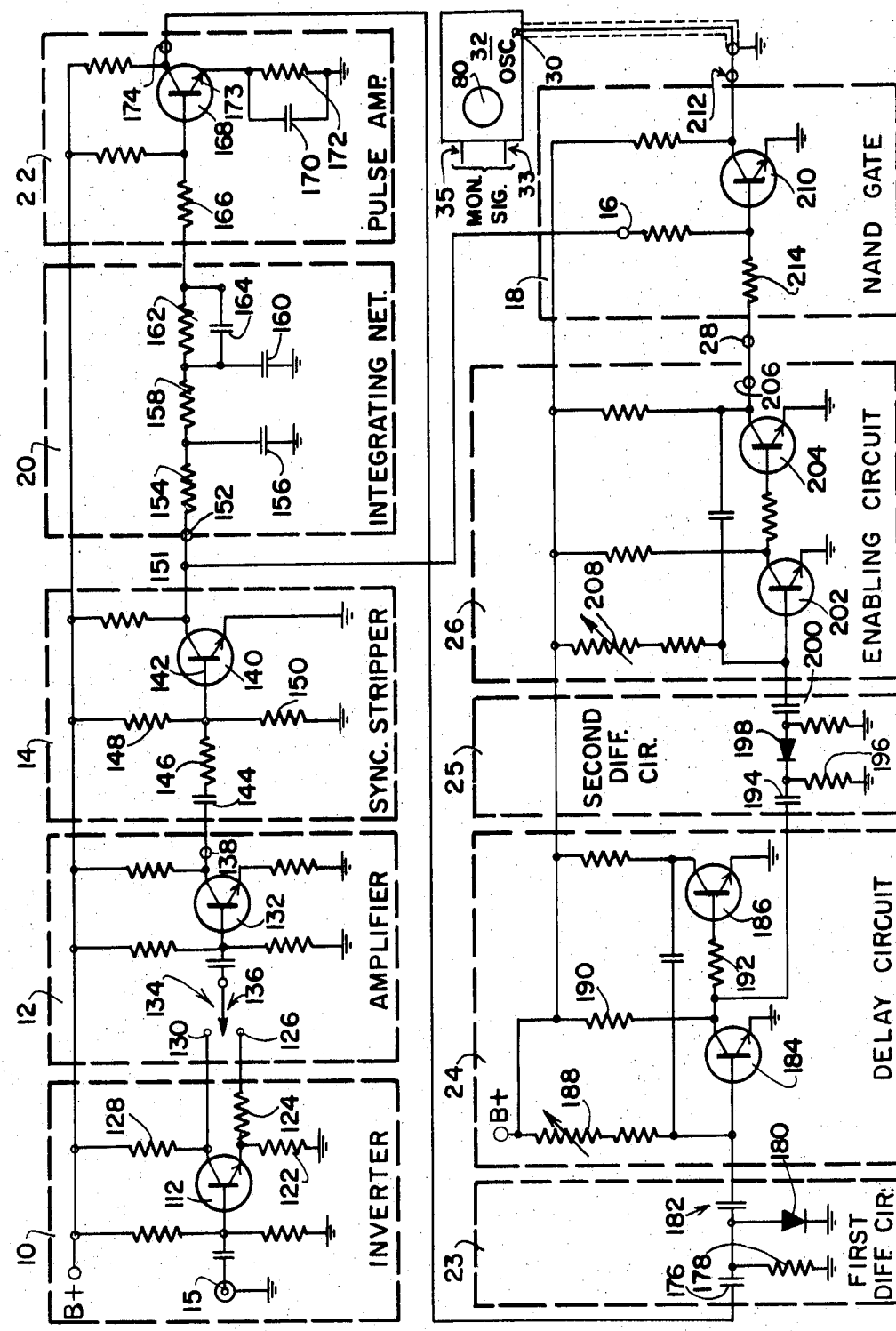
FIG. 1 is a combination block and schematic diagram of a preferred embodiment of the invention.

The oscilloscope triggering circuit utilizes a composite video television signal to allow only a chosen sync pulse or a particular group of chosen successive sync pulses thereof to be applied to the horizontal sweep trigger input of an oscilloscope. The general operation of the oscilloscope triggering circuit will first be described in reference to FIGS. 1 and 2 and then a more specific description will be given. Referring to FIG. 1, inverter 10, amplifier 12, and sync stripper 14 operate to remove the horizontal, vertical and equalizing pulses from a composite television signal like that of FIG. 2A applied to an input 15. These synchronization signals, shown in FIG. 2B, are applied from the output of sync stripper 14 to input 16 of NAND gate 18 and to integrating network 20 which passes most readily the vertical synchronization pulses, illustrated in FIG. 2C, to pulse amplifier 22. After differentiating circuit 23 differentiates each resulting vertical sync pulses into a positive and a negative spike as shown in FIG. 2D, the negative spike which is coincident with the termination of the vertical sync pulse is utilized to switch first variable monostable multivibrator or delay circuit 24 into its quasi-stable state thereby providing a rectangular pulse of FIG. 2E whose lagging edge occurs an adjustable time A after the termination of the vertical sync pulse. Each rectangular pulse is differentiated by circuit 25 and the negative-going portion thereof, which corresponds to its termination as illustrated in FIG. 2F, is used to trigger a second adjustable monostable multivibrator or enabling circuit 26. While the enabling circuit is in its quasi-stable state an enabling pulse, see FIG. 2G, is applied to input 28 of NAND gate 18. In response to this enabling pulse, NAND gate 18 allows whatever synchronizing pulses are being applied during the time interval or period thereof, from sync stripper 14, to pass through the gate and be applied to trigger input 30 of oscilloscope 32.

Therefore, the output pulse of enabling circuit 26 forms an adjustable electrical window which selects sync pulses for selectively triggering an oscilloscope. The leading edge of the window occurs a predetermined time after each vertical synchronizing pulse as established by the adjustable delay time of the delay circuit 24, and, the width of the window is determined by the adjustable recycle time of the enabling circuit 26. Thus by adjusting the delay time of delay circuit 24 the beginning portion of a synchronizing pulse train is selected and by adjusting the recycle time of enabling circuit 26 the number of sync pulses in the selected portion is determined. The selected sync pulse or group of successive pulses triggers the oscilloscope so that selected waveforms which are applied to its vertical input terminals 33 and 35 and which occur in equal or close time relation to the selected trigger pulses can be displayed on the oscilloscope.

A more detailed description of the aforementioned circuit elements and waveform follow. FIG. 2A of the drawing shows portions of a negative, composite video television signal 39 for controlling the timing of one field of scan of the electron beam in a cathode-ray tube. The composite video signal is comprised of a serrated vertical synchronizing pulse 40, equalizing pulses 42 and horizontal synchronizing pulses 43.

A composite video signal of either positive or negative polarity can be applied to input 15 of inverter 10. Transistor 112 redevelops the composite video signal with its original polarity across the emitter load resistor 122, which is connected through loading resistor 124 to output terminal 126. The composite video signal is developed in an inverted form across the collector load resistor 128 which is connected to output terminal 130. Consequently, if a composite video signal of positive polarity is applied to input 15 a composite video signal of negative polarity which is 180° out-of-phase therewith will be developed at output terminal 130. Alternatively, if a composite video signal of negative polarity is applied to input 15, it will reappear at output terminal 126. Therefore, regardless of the polarity of the composite video signal at terminal 15 a composite video signal of negative polarity will be available at either terminal 126 or 130.

Amplifier 12 includes transistor 132 which is biased to amplify composite video signals of negative polarity. Switch 134 can be operated to select by means of selecting portion 136 the signal of negative polarity from either terminal 126 or 130. This signal is amplified by transistor 132 and a composite video signal of positive polarity is produced at output terminal 138. Sync stripper 14 includes transistor 140 which is biased substantially below cutoff. The base biasing network, connected from base 142 of transistor 140 and output terminal 138 of amplifier 12, is comprised of capacitor 144 and resistor 146. This base biasing network in cooperation with the biasing resistors 148 and 150, biases transistor 140 so that it conducts only during the sync pulses of the composite video signal. As a result, only the negative sync pulses 44, as shown in FIG. 2B, are present at output terminal 151 of sync stripper 14. The foregoing circuitry, therefore, selects all the sync pulses from the composite video television signal.

These sync pulses are applied to input 16 of NAND gate 18 and to input 152 of dual integrating network 20 which is comprised of a first integrating network, resistor 154 and capacitor 156, which is cascaded with a second integrating network, resistor 158 and capacitor 160. This dual integrating network filters out the equalizing and horizontal sync pulses and allows only the vertical sync pulses to be applied through the parallel combination of resistor 162 and capacitor 164, and through resistor 166, to the base or normally saturated transistor 168. The parallel combination of capacitor 170 and resistor 172, which are connected to the emitter 173 of transistor 168, cooperate to remove the remains of the serrations not removed by the integrating circuit from the vertical sync pulse so that it appears at output terminal 174 with the form 45 illustrated in FIG. 2C of the drawing.

Each positive-going vertical sync pulse 45 is differentiated by capacitor 176 and resistor 178, of differentiator circuit 23, into a positive-going spike 47, of FIG. 2D, coincident with the leading edge 46 thereof and a negative-going spike 49 coincident with the lagging edge 48 thereof. The positive-going spikes are conducted to ground by diode 180 and the negative-going spikes are coupled through capacitor 182 to turn off normally on transistor 184 thereby turning on normally off transistor 186 of the first monostable or delay circuit 24. Transistor 186 remains on for a predetermined adjustable recycle time which is a function of the setting of rheostat 188. While transistor 184 is off a positive pulse 50 appears at the collector thereof as shown in FIG. 2E, whose duration A can be varied by adjusting rheostat 188.

Differentiating network 25, including capacitor 194 and resistor 196, differentiate each pulse 50 into a positive spike 51 and a negative spike 53 as shown in FIG. 2F. Diode 198 passes the negative-going spike 53, which is coincident with the lagging edge 52 of pulse 50, through capacitor 200 to turn off normally on transistor 202 and turn on normally off transistor 204 of second monostable or the enabling circuit 26. As a result, a negative-going enable pulse 54, shown in FIG. 2G, is developed at output 206 of monostable 26 whose leading edge 56 is coincident with lagging edge 52 of first timing pulse 50 and whose duration B is a function of the setting of rheostat 208.

NAND gate 18 includes transistor 210 which is biased into a saturation so that the voltage level at output 212 is near ground or reference potential unless there are simultaneous near zero potentials at input 16 and 28. Consequently, when there is a simultaneous application thereto of the negative-going enable pulse 54, through resistor 214, along with the application of negative-going sync pulse or pulses 44, from output 151 of sync stripper 14, transistor 210 is turned off in synchronism or coincidence with the selected sync pulses occurring during the period or time interval of pulse 54 which action results in selected positive sync pulses being developed at output 212. These positive sync pulses are coupled to the external trigger input 30 of oscilloscope 32 so that monitored signals applied across vertical input terminals 33 and 35 occurring in time relation with the selected sync signals can be displayed on the scope.

The foregoing described oscilloscope triggering circuitry has many applications. For instance, assume that it is desirable to periodically trigger oscilloscope 32 in synchronism with just horizontal sync pulses 60 through 68 of FIG. 2H so that identical portions of a color bar video signal, from within the circuitry of a TV receiver, corresponding to these pulses would be retraced or superimposed on the screen of the oscilloscope to facilitate trace brightening so that their otherwise indistinguishable details could be observed. In order to display the desired portions, the composite color bar video signal from the color bar generator could be applied to input 15 of the triggering circuit and the video from the receiver could be applied to vertical input terminals 33 and 35 of the oscilloscope. Next rheostat 188, of delay circuit 24, would be adjusted so that the edge 56 of the enabling pulse 54, shown in dotted lines 72 in FIG. 2H, occurs immediately prior to the leading edge 74 of horizontal sync pulse 60. Then rheostat 208, of enable circuit 26, could be adjusted so that the lagging edge 76 of enabling signal 54 occurs after the falling portion 78 of pulse 68. Consequently, only the portions of the video signal occurring in time relation to these pulses will be superimposed on the face of the cathode-ray tube 80 of oscilloscope 32.

What has been described, therefore, is an oscilloscope triggering circuit which operates either on a composite video signal or on a train of sync pulses to allow a selected sync pulse or group of successive selected sync pulses to trigger an oscilloscope so that waveforms applied to the input of the oscilloscope occurring in time relation therewith can be displayed on the screen of the oscilloscope. There are many applications related to the design and test of black and white and color television equipment where the described triggering circuit is particularly useful.

I claim:

1. A circuit for providing a trigger signal to trigger an oscilloscope for display thereon of selected waveforms occurring in time relation to a pulse train of synchronization pulses for controlling the scan of an electron beam in a cathode-ray tube, which triggering circuit provides the trigger signal by allowing only selected synchronization pulses from the pulse train to be applied to the trigger input of the oscilloscope, such triggering circuit including in combination, first signal supply means providing synchronization pulses, first pulse producing circuit connected to said first signal supply means and responsive to the termination of each synchronization pulse to produce a delaying pulse having an adjustable duration, enable pulse producing circuit connected to said first pulse producing circuit and responsive to the termination of each of said delaying pulses to produce a delayed enabling pulse of adjustable time duration, gating means having first input means connected to said enable pulse producing circuit and second input means connected to said first signal supply means, said gating means being responsive to the simultaneous application thereto of said enabling pulses and said synchronization pulses to pass therethrough only those selected synchronization pulses occurring during the time interval of said enabling pulses, conducting means connected between the output of said gating means and the trigger input of the oscilloscope for applying the selected synchronization pulses to trigger the oscilloscope thereby allowing waveforms occurring in time relation to the selected synchronization pulses to be displayed on the oscilloscope.

2. The triggering circuit of claim 1 wherein said first signal supply means includes in combination, a second signal supply means providing a composite video television signal of either polarity, inverter means having the input thereof connected to said second signal supply means and having two output terminals at which are simultaneously produced composite video television signals which are 180° out-of-phase with each other, sync stripper means responsive to composite video television signals of one polarity to remove the synchronization pulses therefrom, switching means connected between said output terminals of said inverter means and the input of said sync stripper means for selecting said composite video television signals of said one polarity from said inverter means and for applying them to said sync stripper means which removes the synchronization pulses therefrom.

3. The triggering circuit of claim 1 wherein said first synchronization pulses include vertical synchronization pulses and wherein said first pulse producing circuit includes in combination integrating circuit means connected to said first signal supply means to separate the vertical synchronizing pulses from said synchronization pulses provided thereby, first differentiating circuit means connected to the output of said integrating circuit means for providing a first differentiation pulse coincident with the terminating portion of each of said vertical synchronizing pulses, first monostable multivibrator means having an adjustable recycle time connected to the output of said first differentiating circuit means, said first monostable multivibrator means being responsive to each of said first differentiation pulses to produce said delaying pulses having adjustable duration.

4. The triggering circuit of claim 1 wherein said enable pulse producing circuit includes in combination, second differentiating circuit means connected to the output of said first pulse producing circuit for providing a second differentiation pulse coincident with termination of said delaying pulses, second monostable multivibrator means having an adjustable recycle time connected to the output of said second differentiating circuit, said second monostable multivibrator means being responsive to each of said second differentiation pulses to produce said delayed enabling pulse of adjustable time duration.

5. A triggering circuit for providing a trigger signal to trigger an oscilloscope for display thereon of selected waveforms occurring in time relation to a pulse train of synchronization pulses which triggering circuit provides the trigger signal by allowing only selected synchronization pulses from the composite video television signal to be applied to the trigger input of the oscilloscope, such triggering circuit including in combination, signal supply means providing the composite video television signal, sync stripping means connected to the output of said signal supply means for removing the synchronization pulses from the composite video television signal, first pulse producing circuit connected to said sync stripping means and responsive to the termination of pulses synchronization pulse to produce a delaying pulse having an adjustable duration, enable pulse producing circuit connected to said first pulse producing circuit and responsive to the termination of each of said delaying pulses to produce an enabling pulse of adjustable time duration, gating means having first input means connected to said enable pulse producing circuit and second input means connected to said sync stripping means, said gating means being responsive to simultaneous application thereto of said enabling pulse and said synchronization pulses to pass therethrough only those synchronization pulses occurring during the time interval of said enabling pulse, conducting means connected between the output of said gating means and the trigger input of the oscilloscope for applying the selected synchronization pulses to trigger the oscilloscope thereby allowing waveforms occurring in time relation to the selected synchronization pulses to be displayed on the oscilloscope.

UNITED STATES PATENT OFFICE
CERTIFICATE OF CORRECTION

Patent No. 3,573,538     Dated April 6, 1971

Inventor(s) Roger A. Swanberg

It is certified that error appears in the above-identified patent and that said Letters Patent are hereby corrected as shown below:

Column 2, line 1, cancel "invention" after SUMMARY OF TH INVENTION. Column 6, line 7, delete "first"; line 10, insert a comma -- , -- after "combination"; line 45, delete "pulses" substitute -- predetermined -- therefor; line 45, at the end of the line, delete "pulse" and substitute -- pulses -- there Signed and sealed this 10th day of October 1972.

(SEAL)
Attest:

EDWARD M. FLETCHER, JR.
Attesting Officer

ROBERT GOTTSCHALK
Commissioner of Patents